(12) United States Patent
Mafune et al.

(10) Patent No.: US 7,071,812 B2
(45) Date of Patent: Jul. 4, 2006

(54) DETECTOR AND LOCK CONTROLLER USING SAME

(75) Inventors: Shoji Mafune, Nagoya (JP); Kazuhiro Negoro, Kasugai (JP); Yasuhiro Satoh, Ootsu (JP); Tadao Nishiguchi, Kyoto (JP)

(73) Assignee: OMRON Corporation, Kyoto (JP)

( * ) Notice: Subject to any disclaimer, the term of this patent is extended or adjusted under 35 U.S.C. 154(b) by 113 days.

(21) Appl. No.: 10/754,450

(22) Filed: Jan. 9, 2004

(65) Prior Publication Data

US 2004/0183651 A1    Sep. 23, 2004

(30) Foreign Application Priority Data

Jan. 10, 2003    (JP)    ............................. 2003-004665

(51) Int. Cl.
  *B60R 25/00*    (2006.01)
  *B60R 25/10*    (2006.01)
  *H04Q 9/00*    (2006.01)

(52) U.S. Cl. ............ 340/5.7; 340/5.61; 340/5.62; 340/5.2; 340/426

(58) Field of Classification Search ........... 340/5.7, 340/5.61, 5.62, 5.2, 426
See application file for complete search history.

(56) References Cited

U.S. PATENT DOCUMENTS 5,940,011 A * 8/1999 Agravante et al. .......... 340/903
5,973,611 A * 10/1999 Kulha et al. ............... 340/5.62
6,522,241 B1 * 2/2003 Baudard ..................... 340/5.61
6,552,649 B1 * 4/2003 Okada et al. ............... 340/5.61
6,700,475 B1 * 3/2004 Geber et al. ............... 340/5.61
6,825,752 B1 * 11/2004 Nahata et al. .............. 340/5.64
6,879,247 B1 * 4/2005 Shimomura et al. ... 340/426.18
6,946,949 B1 * 9/2005 Heide et al. ............... 340/5.61

* cited by examiner

*Primary Examiner*—Michael Horabik
*Assistant Examiner*—Scott Au
(74) *Attorney, Agent, or Firm*—Beyer Weaver & Thomas LLP

(57)    ABSTRACT

A lock controller for automatically unlocking and locking a lockable part such as a vehicle door uses a detector for detecting a hand approaching inside a plurality of detection areas. Such a detector is not only arranged to transmit electromagnetic waves and to receive the reflected waves from a target object of detection such as a person's hand but also provided with a plurality of wave detection circuit parts for mixing wave detection signals corresponding to said transmission waves with signals received by said reception antenna at different sampling timings and outputting the mixed signals. A plurality of judging circuit parts each correspond to different one of the wave detection circuit parts and serve to switch on a detection output based on the outputted signals from said wave detection circuit parts to indicate that said target object is approaching and at a speed within a specified range. The detection areas have different sizes for each of the judging circuit parts corresponding to the different sampling timings of the wave detection circuit parts.

19 Claims, 5 Drawing Sheets

DETECTOR AND LOCK CONTROLLER USING SAME

BACKGROUND OF THE INVENTION

This invention relates to a detector conveniently usable for detecting the user's hand as it approaches the door handle of an automobile and generating a trigger signal for initiating the automatic unlocking operation of a passive entry system for the automobile. The invention also relates to lock controllers using such a detector.

In recent years, proposals are being made for vehicle entry system apparatus for automatically operating an equipment on a vehicle by carrying out two-way communications between a device carried by the user and a vehicle-mounted main device and thereby carrying out a required comparison, and some of such apparatus are actually coming to be used. With such an apparatus adapted to carry out two-way communications, an answer signal containing a necessary code can be automatically transmitted from the device carried by the user to the main device in response to a request signal (such as a startup signal for starting up the device being carried) transmitted from the main device and hence an equipment on a vehicle can be caused to carry out a specified operation without the user carrying out any operations at all. With a vehicle entry system, for example, the user carrying a portable device may have only to approach the door of a specified vehicle to which a corresponding main device is mounted for establishing a two-way communication between them such that a lock-opening command is automatically outputted to the locked door and the locked door becomes automatically unlocked. Such highly convenient entry systems capable of locking and unlocking a vehicle door basically without requiring any conscious effort on the part of the user are sometimes referred to as a passive entry system (or a smart entry system) as an improved version of general keyless entry systems, and needs for such systems are becoming higher as they are capable of increasing the market values of the vehicles.

If it is attempted with such a passive entry system to save the power of the vehicle battery by transmitting request signals from the main device only when they are necessary, it may become necessary to provide a detector for detecting the user approaching or contacting the vehicle (such as to its door handle). Optical sensors and capacitance sensors have recently been used for such a purpose. Another approach has been to provide a push-button switch on or near the door handle for the user to operate on for generating a trigger signal for an automatic locking operation when the user leaves the vehicle.

Optical sensors are adapted, for example, to detect the user's hand approaching the door handle on the basis of a change in the output from a light-receiving element as light outputted from a light-emitting element is screened or reflected by the user's hand. Capacitance sensors are so-called touch sensors and adapted, as disclosed in Japanese Patent Publication Tokkai 2002-295064, to detect the user's hand approaching the door handle based on a change in the capacitance of a capacitor within the sensor by the contact of the user's hand. Examples of known non-contact type short-distance sensors include impulse radars which are adapted to make detections by analyzing reflected waves by using a microcomputer and are used, for example, for the detection of land mines, as disclosed in International Patent Publication 00/023,762.

Prior art technologies characterized as using a detector or a switch as explained above have the following problems.

(A) Optical sensors may function incorrectly in the presence of unwanted objects such as rain drops and dead leaves.

(B) Response characteristics of optical sensors and capacitance sensors are not sufficient because their detection areas are small (or their detection distance is short) and the system depending on such a sensor may function incorrectly. If such a sensor is set to the door handle of a vehicle for providing a trigger for the transmission of a request signal in a passive entry system of the vehicle, for example, the user's hand may not be detected and hence the request signal may not be outputted until the hand nearly touches the sensor. Thus, the user may have already started to pull the handle in order to open the door but the door may not be unlocked yet. In other words, the user may try to open the locked door by using a passive entry system but its automatic unlocking operation may be delayed and the door may refuse to open immediately.

(C) Since sensor elements which are relatively large and hence are difficult to be contained must be provided to a component such as a door handle intended to detect the approaching target object of detection, the shape and the size of such a component may have to be modified significantly and hence the freedom in its design is severely restricted.

(D) When a trigger of the aforementioned kind, for example, for a passive entry system of a vehicle is generated by means of a switch to be operated by the user, the freedom of design for the part to which the switch is to be attached, such as the door or the door handle, is significantly limited. Besides, a switch operation by the user is required. It is inconvenient and affects the operability adversely.

Sensors of electromagnetic wave types such as aforementioned impulse radars are examples of non-contact type sensors capable of setting the detection area to be large and not influenced by dirt. The present inventors attempted to use such sensors of electromagnetic wave type as the aforementioned detectors but the following problems still remained.

(E) It is difficult to normalize the detection area. If the detection area is made larger in view of Problem (B) above, a trigger may be generated against the user's intention, for example, when the user happens to lean on the door handle. Erroneous operations are also likely due to a strong external noise such as electromagnetic waves from a portable telephone.

(F) Only a detection area of a fixed size could be set for a prior art sensor of electromagnetic wave type and hence it was impossible to adjust the detection area optimally according to the condition of the system to which it is to be used. As a trigger for automatic unlocking by a passive entry system, for example, it is necessary to be able to detect the use's hand at an early stage within a relatively large detection area in view of the aforementioned Problem (B). As a trigger for automatic locking by the same system, however, there is no such problem (Problem (B)) and hence it is desirable to detect the approaching user's hand reliably within a relatively small area without committing an erroneous operation. If the detection area of only a fixed size can be set, however, this kind of adaptable operations cannot be carried out and a switch as explained above may be required to be set for the generation of a trigger for automatic locking and hence aforementioned Problem (D) remains.

It may be considered to simply use a plurality of sensors of electromagnetic wave type for setting up a plurality of detection areas. This, however, means that a plurality of sets of antennas for transmission and reception must be set up near the door handle or in its neighborhood and this results in a complicated structure. This means that aforementioned Problem (C) cannot be eliminated satisfactorily. There is also the disadvantage that the amount of power consumed by the detector increases by a factor of 2, 3, etc.

It is therefore an object of this invention to make use of the technology of electromagnetic radars to provide an improved detector superior in operational reliability, response characteristics, operability by the user and capability of being mounted to a vehicle as well as from the points of view of size, freedom in design and power consumption.

It is another object of the invention to provide a lock controller using such a detector.

SUMMARY OF THE INVENTION

A detector according to a first embodiment of this invention may be characterized as being adapted to detect a target object such as the hand of a person entering detection areas and as comprising a wave outputting device for outputting waves at a specified transmission timing, a transmission antenna for transmitting into space as electromagnetic waves transmission waves outputted by the wave outputting device, a reception antenna for receiving the electromagnetic waves transmitted from the transmission antenna and reflected from the target object, a plurality of wave detection circuit parts for mixing wave detection signals corresponding to the transmission waves with signals received by the reception antenna at different sampling timings, and a plurality of judging circuit parts each corresponding to different one of the wave detection circuit parts and serving to switch on a detection output based on an output from the corresponding one of the wave detection circuit parts to indicate that the target object is approaching, wherein the detection areas have different sizes for each of the judging circuit parts corresponding to the different sampling timings of the wave detection circuit parts. Such a detector is suited to be mounted to a structure such as a motor vehicle having a lockable component that opens and closes such as a door and to detect the user's hand as it approaches a handle or a knob on such a component for generating a trigger for its passive entry system.

In the above, it is preferable that the judging circuit parts do not make use of a microcomputer, being adapted to switch on the detection output if the amplitude level of the component of the signal outputted from the wave detection circuit parts within the frequency range corresponding to the range of speed of the motion of the target object is within a specified range corresponding to the known material property (such as the dielectric constant that affects the reflection characteristic of electromagnetic waves) of the target object. Such a judging circuit part may be made compact and as a simple structure with a filter (such as a bandpass filter adapted to output only those components of the output signals from the wave detection circuit parts that are within the aforementioned frequency range and a circuit adapted to compare the amplitude level of the output from this filter with a threshold value corresponding to a boundary of this specified range and to switch on the detection output if the amplitude level is on the side of the threshold value towards the specified range.

There are many advantages to a detector as described above. For example, since the user's hand approaching the door is detected in a non-contact way by using the impulse radar technology, errors in detection due to dirt or the like do not occur and even the possibility of a detection error due to unwanted objects such as rain drops and dead leaves is significantly lower than by a conventional optical sensor. As another example, since the detection area can be made sufficiently large (or the detection distance sufficiently long) by setting the transmission output, the reception sensitivity and the sampling timing appropriately, a sufficient response characteristic can be easily obtained.

The invention relates also to a detector of another kind, using electromagnetic waves and having a plurality of detection areas with different sizes, characterized as comprising a sensor circuit for switching on a detection output by detecting in each of the detection areas presence of a target object and a correcting device for concluding that the target object is absent if the detection outputs associated with the plurality of detection areas are switched on substantially simultaneously. In the above, "detector using electromagnetic waves" is intended to mean the kind of detectors adapted to detect an approaching object from the reflection of transmitted electromagnetic waves. With a detector of this kind as described above, too, the same advantages obtained by detectors according to the first embodiment of the invention can be obtained. It is particularly advantageous since the detector can be prevented from incorrectly switching on the detection output due, for example, to external disturbances.

The invention further relates to a detector of a third kind for detecting a target object approaching inside a detection area, characterized as comprising a wave outputting device for outputting waves at a specified transmission timing, a transmission antenna for transmitting transmission waves outputted into space as electromagnetic waves by the wave outputting device, a reception antenna for receiving the electromagnetic waves transmitted from the transmission antenna and reflected from the target object, a wave detection circuit part for mixing wave detection signals corresponding to the transmission waves with signals received by the reception antenna at a specified sampling timing and outputting the mixed signals, and a judging circuit part serving to switch on a detection output based on the outputted signals from the wave detection circuit part to indicate that the target object is approaching, wherein the size of the detection area changes corresponding to the specified sampling timing. According to this embodiment of the invention, the size of the detection area is changed as different sampling timings are specified. Thus, this essentially has the same advantages as the first two embodiments of the invention described above because detection areas having different sizes are effectively being used. This embodiment is advantageous in that it is not necessary to provide a plurality of wave detecting circuit and judging circuit parts and hence the detector can be made more compact and structurally simpler and the power consumption can be reduced.

The invention additionally relates to lock controllers. A lock controller according to this invention may be characterized basically as comprising a detector according to the first or second embodiment of this invention as described above and what is herein referred to as a main apparatus The main apparatus is adapted not only to be provided to a structure such as a vehicle with a lockable part such as a door having a handle and being adapted to open and close, but also to send by wireless transmission a specified request signal to a portable device carried by the user if a detection output corresponding to a specified one (not the smallest) of the detection areas of the detector is switched on while the lockable part is locked, to receive an answer signal from the portable device in response to the request signal, and to cause the part to be unlocked after ascertaining that specified conditions for unlocking are satisfied. In the above, the specified conditions are to include condition that the received answer signal be a correct signal. With a lock controller thus structured, the user's hand approaching the handle is detected reliably and with good response characteristics by a detector according to either the first or second embodiment of the invention and this is used as the trigger for sending a request signal to the portable device carried by the user. Thus, the advantages of the detectors according to this invention are fully utilized and the possibility of erroneous operations can be significantly reduced.

In the above, the "specified conditions" may include the condition that the detection output corresponding to another detection area smaller than the aforementioned one detection area be switched on after the detection output corresponding to the specified detection area is switched on. With this additional condition imposed, the automatic unlocking operation is effected only when the detection outputs from a specified detection area and a smaller detection area are sequentially switched on such that it may be concluded that the user's hand is approaching the handle in a normal manner.

It is preferable if the aforementioned main apparatus is further adapted to send by wireless transmission another specified request signal to the portable device carried by the user when a detection output corresponding to a detection area smaller than the aforementioned one detection area of the detector is switched on while the lockable part is unlocked, to receive an answer signal from the portable device in response to the request signal, and to cause the lockable part to be locked after it is ascertained that the received answer signal is a correct signal. This embodiment is advantageous because the detector is made to function also as a trigger for the automatic locking operation. Thus, prior art button switches of the kind for the user to operate on need not be provided and the freedom in design is improved. Since the user is not required to operate on such a switch, the operability is also hereby improved.

The invention also relates to a lock controller according to another embodiment characterized not only as comprising a detector according to the third embodiment of the invention as described above and a main apparatus which is provided to a structure such as a vehicle with a lockable part such as a door having a handle and being adapted to open and close, but also wherein the main apparatus, when the lockable part in locked, is adapted to set the specified sampling timing of the wave detection circuit part so as to make the detection area relatively large, to send by wireless transmission a specified request signal to a portable device carried by the user if a detection output of the detector is switched on with the detection area made relatively large, to receive an answer signal from the portable device in response to the request signal, and to cause the lockable part to be unlocked after ascertaining that specified conditions for unlocking (including the condition that the received answer signal is a correct signal) are satisfied, and wherein the main apparatus, when the lockable part is unlocked, is adapted to set the specified sampling timing of the wave detection circuit part so as to make the detection area relatively small, to send by wireless transmission a specified request signal to the portable device carried by the user if a detection output of the detector is switched on with the detection area made relatively small, to receive an answer signal from the portable device in response to the request signal, and to cause the lockable part to be locked after ascertaining that the received answer signal is a correct signal. With such a lock controller, too, favorable effects obtainable by lock controllers according to the first embodiment of the invention can be obtained.

In the above, it is preferable if the aforementioned "specified conditions" further include condition that the detection output be switched on with the detection area made relatively small by setting the specified sampling timing of the wave detection circuit part accordingly after the detection output becomes switched on with the sampling timing of the wave detection circuit part set so as to make the detection area relatively large. With this additional condition imposed, the automatic unlocking operation is effected only when the detection outputs from a specified detection area and a smaller detection area are sequentially switched on such that it may be concluded that the user's hand is approaching the handle in a normal manner. Thus, the unlocking operation can be effected more reliably.

DETAILED DESCRIPTION OF THE INVENTION

The invention is described next by way of examples with reference to the drawings.

Figure 1A:
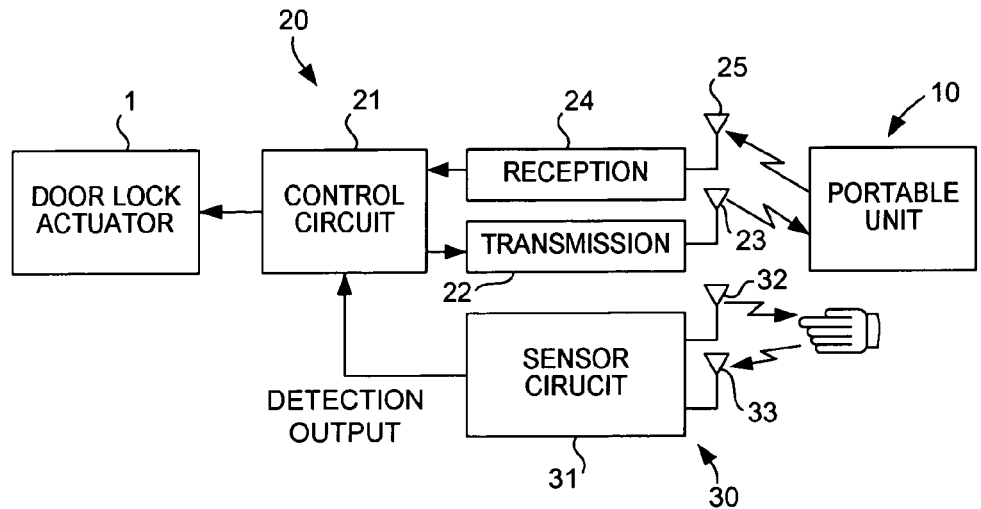
FIGS. 1A and 1B are block diagrams of respectively a lock controller and a detector embodying this invention.

FIG. 1A shows a first embodiment of this invention as applied, for example, to a control device of a passive entry system for the door on the driver's side of a vehicle, comprising a portable unit 10, a main device 20 mounted to the vehicle and a detector 30.

Although not illustrated in FIG. 1A in detail, the portable unit 10 is provided with an antenna and a reception circuit for receiving a low frequency (LF) startup signal of about 100–150 kHz, a transmission circuit and an antenna for the wireless transmission of answer and operation (lock and unlock) signals to be described below on a high-frequency wave (say, within the UHF band), a memory (such as an EEPROM) for storing at least an identification check code (or the "ID code"), a control circuit including a microcomputer for controlling the entire operation of the portable unit 10 and battery cells.

In the above, the startup signal is a signal for starting up the microcomputer of the portable unit 10 in the power-saving WAIT mode (or the SLEEP mode). The microcomputer of the portable unit 10 is programmed so as to transmit an answer signal including the aforementioned ID code on a high-frequency electromagnetic wave. In this sense, the aforementioned startup signal may be said to serve as a request signal according to this invention.

Power which is required for the portable unit 10 (at least at the time of the startup) may be arranged to be supplied from the main device 20. Since the transmission from the main device 20 to the portable unit 10 is by way of a low-frequency wave, power transmission on this wave can be carried out relatively efficiently. In fact, it is possible in principle to supply all of the power required by the portable unit 10 from the main device 20 such that the portable unit 10 may not be required to contain any battery cells.

The portable unit 10 may be provided with lock and unlock switches (not shown) of a push-button type on its surface so as to function as a remote controller (for one-way transmission) of an ordinary keyless entry system. In other words, the portable unit 10 may be adapted to function not only so as to transmit the answer signal for a specified number of times upon being started up by receiving the startup signal but also so as to start up as the lock switch or the unlock switch is operated and to carry out the wireless transmission of a lock signal or an unlock signal inclusive of the ID code. As the lock signal or the unlock signal is received by the main device 20, the ID code is checked and the vehicle door is immediately locked or unlocked.

The portable unit 10 according to this example is adapted to automatically return to the WAIT mode as soon as a requested operation (such as the transmission of the answer signal) is completed and to remain in the WAIT mode until the startup signal is received next such that wasteful consumption of power may be avoided. This feature, however, is not intended to limit the scope of this invention. The portable unit 10 may be adapted to normally remain in a standby mode and become intermittently activated into an active mode at specified intervals to activate the reception circuit. If a specified request signal (which may not be the startup signal but may be only for requesting an answer signal and need not be a low-frequency signal but may be a high-frequency signal) is received from the main device 20 while the reception circuit is intermittently activated, the portable unit 10 may respond to it by carrying out for a specified number of times the wireless transmission of an answer signal inclusive of the ID code registered in the memory on the side of the portable unit 10.

With reference still to FIG. 1A, the main device 20 comprises a control circuit 21, a transmission circuit 22 with a transmission antenna 23, and a reception circuit 24 with a reception antenna 25. The transmission circuit 22 and the transmission antenna 23 are for the purpose of transmitting the aforementioned low-frequency startup signal, and the reception circuit 24 and the reception antenna 25 are for the purpose of receiving the aforementioned high-frequency answer signal and operation signals. The control circuit 21 includes a microcomputer serving to carry out necessary operations for controlling the main device 20 as a whole as well as a door lock actuator 1 of the vehicle. It also includes a memory device such as an EEPROM for storing the ID code.

The control circuit 21, the transmission circuit 22 and the reception circuit 23 are inside a control unit which may be disposed, for example, inside the door of the vehicle. The transmission and reception antennas 23 and 25 may be provided to the control unit 21 but may also be set at some other place such as on the room mirror, the door mirror or the door handle either together with or apart from the transmission and reception circuits 22 and 24.

The detector 30 is a door handle sensor adapted to detect a body part (such as a hand or a finger) of the user approaching the door handle of the vehicle by using the impulse radar technology and to generate a detection output which will serve as a trigger for the automatic locking or unlocking operation on the door. As shown in FIG. 1A, it includes a sensor circuit 31, a transmission antenna 32 and a reception antenna 33.

Figure 1B:
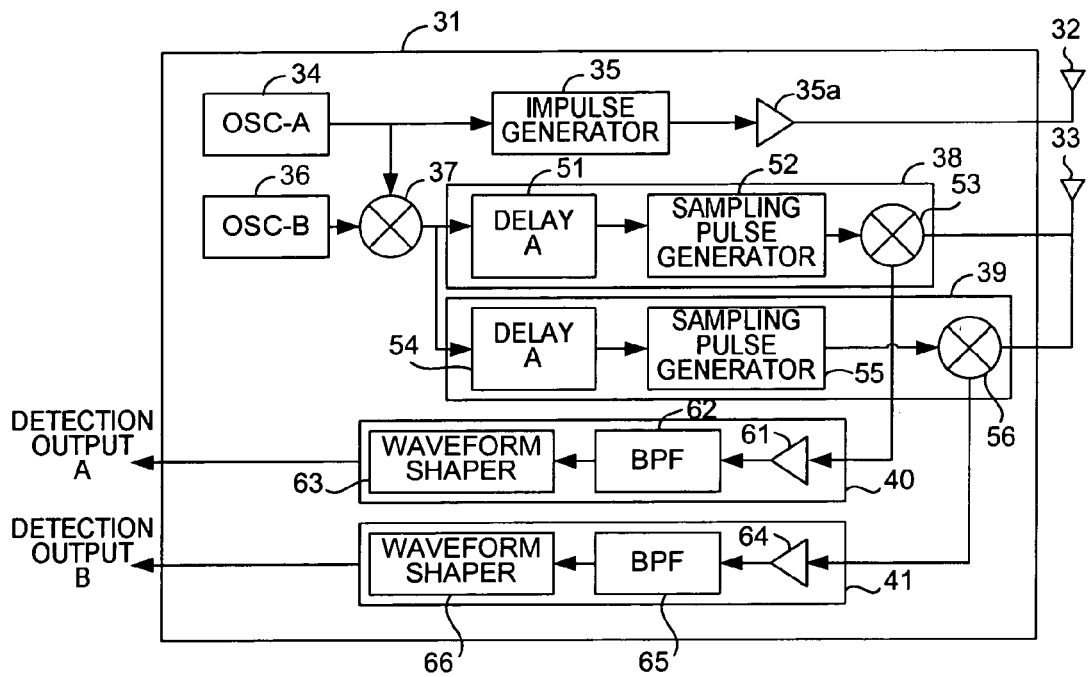

As shown more in detail in FIG. 1B, the sensor circuit 31 includes a first oscillator circuit OSC-A 34 for generating transmission clock, an impulse-generator circuit 35, a transmission amplifier 35a, a second oscillator circuit OSC-B 36 for generating reception clock, a beat generator circuit 37, wave detection circuit parts 38 and 39 and judging circuit parts 40 and 41. In the above, the transmission clock generator circuit 34, the impulse-generator circuit 35 and the transmission amplifier 35a may together be referred to as the "wave outputting device." The reception clock generator circuit 36 and the beat generator circuit 37 are elements of this invention for generating wave detection signals.

The sensor circuit 31 may be disposed within the aforementioned control unit together with the control circuit 21 or inside the door or the door handle together with or separate from the transmission antenna 32 and the reception antenna 33. The transmission and reception antennas 32 and 33 are in the shape of a single bar prepared according, for example, to the shape of the door handle and may be buried or pasted in parallel or separate from each other on the inner surface of the door handle or the door. The shapes, positions and methods of production of these antennas are not intended to limit the scope of the invention and will not be explained in any detail.

The transmission clock generator circuit 34 is for generating the standard wave (say, of 455 kHz) for the impulse radar and may comprise an oscillator circuit using a quartz crystal oscillator element as its source of oscillations. The reception clock generator circuit 36 is for generating the beat wave (say, of 14 Hz) for the impulse radar and is formed separate from the transmission clock generator circuit 34 with a Colpitts oscillator with a low power consumption rate.

Although prior art impulse radars used, say, for the detection of land mines are adapted to generate a beat wave by means of a divider circuit for dividing many times the output from the circuit for the generation of standard wave, this means that a large amount of electric current is wasted by the divider circuit. Thus, it is not feasible to use such a prior art impulse radar directly in the detector 30 of this invention in view of the limited capacity of its battery cells. This problem can be obviated by generating the beat wave by means of an oscillator circuit of a different type which consumes less power.

The impulse-generator circuit 35 serves to shape the waveform generated by the transmission clock generator circuit 34 and to transmit it to the transmission antenna 32 through the transmission amplifier 35a as a rectangular pulse wave of a specified form, thereby switching on and off the transmission antenna 32 periodically to transmit electromagnetic waves of a specified kind at a specified transmission timing (with frequency components limited by the bandwidth of the transmission antenna 21 but including higher harmonics).

The beat generator circuit 37 is for mixing the beat wave with the standard wave to generate a sampling pulse (with fluctuation components corresponding to the beat wave) by changing the waveform of the standard wave by the beat wave. The technology of adding fluctuations corresponding to a beat wave to a sampling pulse is one of the methods for efficiently receiving correct reflected waves with an impulse radar.

Figure 2A:
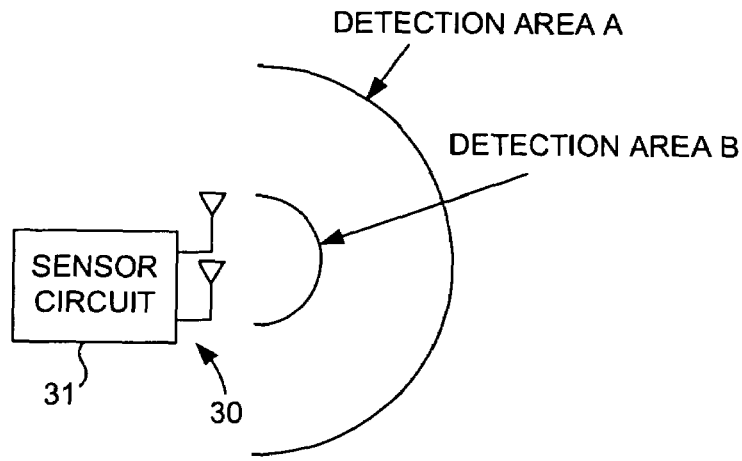
FIGS. 2A, 2B and 2C are drawings for explaining the detection areas of and outputs from the detector of FIGS. 1A and 1B.

The wave detection circuit part 38 includes a first delay circuit (DELAY A) 51, a sampling pulse generator circuit 52 and a sample-and-hold circuit 53. The other wave detection circuit part 39 includes a second delay circuit (DELAY B) 54, another sampling pulse generator circuit 55 and anther sample-and-hold circuit 56. The first delay circuit 51 is for setting sampling timing A for a relatively larger detection area A shown in FIG. 2A corresponding to the transmission timing of the aforementioned transmission wave. The second delay circuit 54 is for setting sampling timing B for a relatively smaller detection area B shown in FIG. 2A, the sampling timing B being shorter than the sampling timing A by the time length corresponding to the distance by which the detection distance is shorter. The relatively smaller detection area B may correspond, for example, to the interior of the door handle such that the user's hand is detected when it is inserted inside or touches the handle. If the smaller detection area B is thus narrowly defined, the detection output A (to be explained below) from the larger detection area A may be switched on when somebody may lean on the door handle without intending to open the door but the detection output B (to be explained below) from the smaller detection area B remains switched off and the door will not be unlocked inadvertently.

The sampling pulse generator circuit 52 is for shaping the waveform generated by the beat generator circuit 37 and is inputted through the first delay circuit 51 and transmitting it to the sample-and-hold circuit 53 as the wave detection signal. The sample-and-hold circuit 53 serves to mix the output from the sampling pulse generator circuit 52 into the input from the reception antenna 33 at the specified sampling timing A to output the specified low-frequency components taken out of the input from the reception antenna 33 (including the signal components of the reflected waves caused by the motion of the target object of detection).

The sampling pulse generator circuit 55 is for shaping the waveform of the sampling pulse generated by the beat generator circuit 37 and inputted through the second delay circuit 54 and transmitting it to the sample-and-hold circuit 56. The sample-and-hold circuit 56 serves to mix the output from the sampling pulse generator circuit 55 (the detection signal according to this invention) into the input from the reception antenna 33 at the specified sampling timing B to output the specified low-frequency components taken out of the input from the reception antenna 33 (including the signal components of the reflected waves caused by the motion of the target object of detection).

The judging circuit part 40 includes a lower-frequency signal amplifier circuit 61, a bandpass filter (BPF) 62 and a waveform shaper circuit 63. This amplifier circuit 61 is for the purpose of amplifying the output from the sample-and-hold circuit 53 to a level which is easier to handle and is in principle not a required component. The bandpass filter 62 is for allowing, out of the output signals from the amplifier circuit 61, only those signal components corresponding to the expected speed of motion of the object to be detected (such as 1 Hz—several tens Hz). The waveform shaper circuit 63 is adapted to compare the amplitude level of the output from the bandpass filter 62 with a threshold value corresponding to the lower limit of a specified range of a physical property (such as dielectric constant) of the object of detection (such as a person's hand) and to switch on its output (the detection output A) if the amplitude value is on the side of the specified range (or above the threshold value in this example).

The judging circuit part 41 is adapted to switch on the detection output B by similarly processing the output from the sample-and-hold circuit 56, including a lower-frequency signal amplifier circuit 64, a bandpass filter (BPF) 65 and a waveform shaper circuit 66.

With the detector 30 thus structured, when a target object of detection such as the hand of a person approaches (and in particular at a speed within an expected range) within the distance of the detection area A from the place such as the door handle where the detector 30 is located, or where its antennas 32 and 33 are located, characteristic output values (such as frequency and amplitude level) of the amplifier circuit 61 enter the characteristic value range of the bandpass filter 62 and the waveform shaper circuit 63 and the output from the waveform shaper circuit 63 (the detection output A) is switched on. As the target object of detection further approaches the detector 30 (or its antennas 32 and 33) and comes within the distance of the detection area B, characteristic output values (such as frequency and amplitude level) of the amplifier circuit 64 enter the characteristic value range of the bandpass filter 65 and the waveform shaper circuit 66 and the output from the waveform shaper circuit 66 (the detection output B) is switched on.

If the target object of detection such as a hand has come within the detection area A but remains outside the detection area B, since the sampling timing B of the wave detection circuit part 39 does not match the reception timing of the reflected wave, the characteristic output value of the amplifier circuit 64 does not fall within the aforementioned characteristic value range and the output from the waveform shaper circuit 66 (the detection output B) remains switched off. If the target object of detection enters within the detection area B, since the sampling timing A of the wave detection circuit part 38 ceases to match the reception timing of the reflected wave, the characteristic output value of the amplifier circuit 61 fails to fall within the characteristic value range and the output from the waveform shaper 63 (the detection output A) becomes switched off.

Figure 2B:
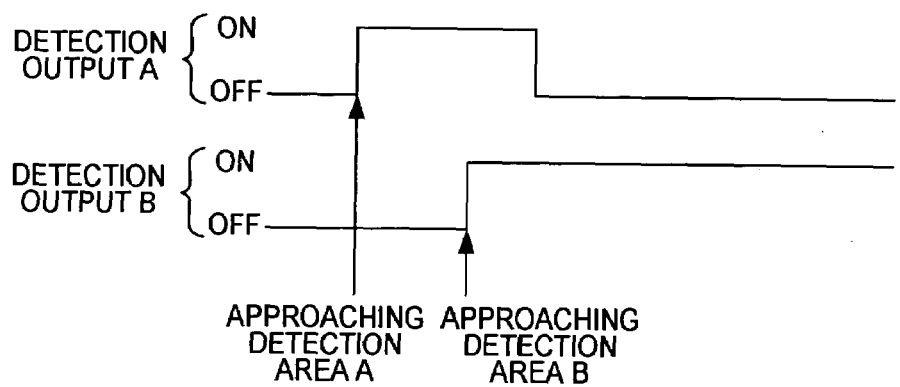

Thus, as the user's hand is extended towards and comes into contact at a proper speed with the door handle where the detector 30 is set, the detection outputs A and B change as shown in FIG. 2B, that is, the detection output B becomes switched on some time after the detection output A is switched on.

Figure 2C:
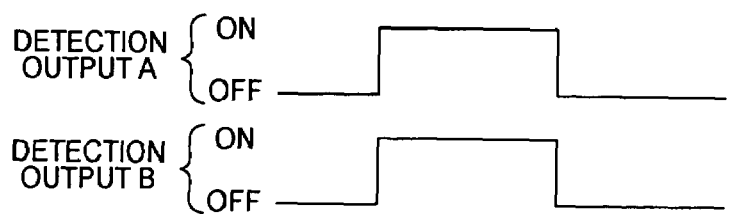

If there is a source of noise such as a portable telephone in the proximity with a disturbance strong enough to switch on the detection output A, the aforementioned difference between the detection areas A and B may become insignificant and the detection outputs A and B may change approximately in the same way, as shown in FIG. 2C, both detection outputs becoming switched on nearly at the same time.

In the above, the amplitude level is a parameter that indicates the reception strength of the received (reflected) wave, increasing or decreasing mainly according to the dielectric constant of the approaching object if the difference in distance from the antenna is ignored. Thus, the waveform component due to an object with a dielectric constant different from that of the target object will be below the aforementioned threshold value even if its frequency (indicative of the speed of approach) is about the same as that of the target object. Thus, it is not within the judgment area and is not detected. For example, water, paper and plastic materials have much lower dielectric constants and hence can be reliably eliminated by the process of the waveform shaper circuit 63 explained above. In other words, even if a piece of paper or a dead leaf approaches the antennas 32 and 33 at the same speed as the hand of a person, the detection output is not switched on and no detection error will result.

Frequencies of the characteristic values of the amplifier circuit 6 (frequencies of the components due to the reflection from a moving target object) depend on the speed of motion of the approaching object, as explained above. Thus, the waveform components of objects moving at speeds different from the speed of the target object are outside the characteristic range of the bandpass filters 62 and 65 and are not detected even if the amplitude level (or the dielectric constant of the object) is about the same as that of the target object. As a result, falling objects moving faster than the hand of a person or objects moving much slower (inclusive of stationary objects) can be reliably excluded from consideration by the bandpass filters 62 and 65. For example, even if the vehicle is parked with the antennas 32 and 33 remaining near a telephone post of a metallic material, the metallic post will not be erroneously detected as the hand of a person. Even if rain drops with a high dielectric constant are falling, an error in detection can be avoided with a high probability.

In summary, if the hand of a person approaches the detector 30 of this invention, a detection output is dependably switched on while an erroneous operation when an object of other types approaches (and at least a repeated occurrence of errors) can be avoided on most occasions. If a person's hand approaches the detector 30 at a normal speed, the detection outputs A and B are switched on sequentially with a certain time interval in between, as explained above with reference to FIG. 2B, while the two detection outputs A and B are switched on nearly simultaneously if they are switched on erroneously due to an external disturbance. Thus, a correction device may be provided for correcting the results of detection according to this difference in the detection operations, say, by switching off both the detection outputs A and B to the control circuit 21 if they are switched on at times separated by less than a specified short interval. With such a correction device, erroneous detections and the consequent errors in system operations caused by external disturbances can also be prevented. Such a correction may be carried out as one of the functions of the control circuit 21 (Step 2 to be explained below).

Next, the functions of the control circuit 21 and the operations of the system of this invention are explained in basic terms. If the detection output A from the detector 30 is switched on while the door of the vehicle is in the locked condition (or while the door lock actuator 1 is activated), the aforementioned startup signal is outputted from the transmission circuit 22 and the transmission antenna 23 for a specified number of times and the reception circuit 24 is also activated to receive wave signals. If an answer signal is received from the portable unit 10 after the startup signals are transmitted, it is checked to determine whether or not the ID code contained in the answer signal corresponds to the ID code preliminarily registered in the memory. If the codes match, the door lock actuator 1 is controlled under the condition that the detection output B is switched on such that the locked door of the vehicle is unlocked.

If the detection output B of the detector 30 is switched on while the door is in the unlocked condition, the control circuit 21 also serves to transmit the startup signal. If the answer signal is received and the ID code is successfully checked, the door lock actuator 1 is controlled such that the unlocked door is locked.

Figure 3:
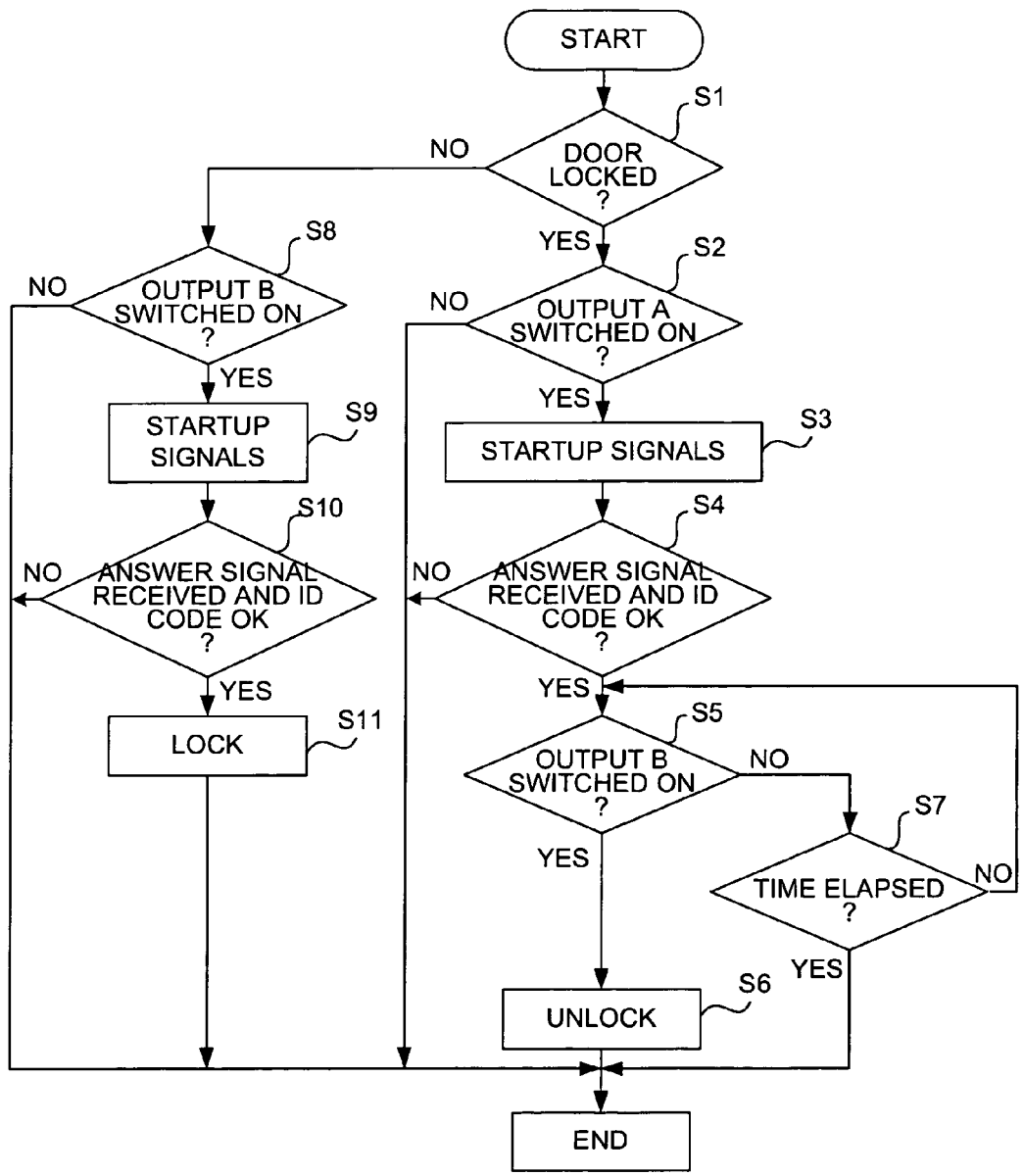
FIG. 3 is a flowchart of the control operations by the lock controller of FIG. 1A.

FIG. 3 shows an example of flowchart for the control process explained above. The control circuit 21 may be adapted to repeat the operations of FIG. 3 in a periodic manner.

In Step S1, it is determined whether the door is in the locked condition or not. If the door is not locked (NO in Step S1), the process proceeds to Step S8. If the door is locked (YES in Step S1), it is determined whether or not a hand has been detected in the detection area A, that is, whether or not the detection output A of the detector 30 is switched on (Step S2). If the detection is not being made (NO in Step S2), the cycle of the processes is completed. If the detection is being made (YES in Step S2), the process proceeds to Step S3. In Step S2, the condition of the detection output B is also examined. If it is determined that the detection outputs A and B became switched on at times that are different by less than a specified small time period, it is treated as if there were no detection outputs and the cycle is terminated. After the cycle of the processes is terminated, the next cycle is started from Step S1 at the next timing.

In Step S3, the transmission circuit 22 is controlled to have the startup signal transmitted for a specified number of times. Next, it is determined whether or not an answer signal has been received and the ID code contained in the received answer signal has been found to correctly match (Step S4). If the ID code is found to be correct (Yes in Step S4), it is determined whether or not the hand has been detected in the detection area B after the detection output A came to be switched on in Step S2 (Step S5), that is, whether or not the detection output B of the detector 30 is switched on. If the detection output B is switched on (YES in Step S5), the door is unlocked by controlling the door lock actuator 1 (Step S6). If the detection output B is not switched on (NO in Step S5), it is checked whether or not the time elapsed since the detection output A became switched on has reached a specified length (Step S7). If the elapsed time has reached the specified length (Yes in Step S7), the cycle of the processes is terminated. If the elapsed time has not reached the specified length (NO in Step S7), the process returns to Step S5 and the subsequent steps are repeated.

If it is determined in Step S8 that the hand has been detected in the detection area B, the startup signal is transmitted as in Step S3 (Step S9) and it is determined whether or not an answer signal has been received and its ID code is correct (Step S10), as done in Step S4. If the ID code is correct (YES in Step S10), the door is locked by controlling the door lock actuator 1 (Step S11). If it is determined that the hand is not being detected in Step 8 or if the ID code is found not to be correct in Step S10, the cycle of the processes is terminated.

Favorable characteristics of the detector 30 as well as a lock controller using such a detector are described next.

(1) Since the user's hand approaching the door is detected in a non-contact way by using the impulse radar technology, errors in detection due to dirt or the like do not occur and even the possibility of a detection error due to unwanted objects such as rain drops and dead leaves is significantly lower than by a conventional optical sensor. Since the distinction between a hand and other unwanted objects is made on the basis of both reception intensity (or its amplitude level) and the frequency of the reflected wave, the possibility of erroneously detecting objects other than a hand is extremely low. Thus, the possibility of a device starting up its operation due to an erroneous detection (with the startup signal transmitted and power of the battery cells of the vehicle consumed uselessly) is significantly reduced.

(2) Since the detection area can be made sufficiently large (or the detection distance sufficiently long) by setting the transmission output, the reception sensitivity and the sampling timing appropriately, an appropriate response characteristic can be easily obtained. Since the user's hand can be detected at a position sufficiently before it contacts the door handle, the door which was in the locked condition when the user was merely beginning to pull the door in order to open it can be automatically unlocked in a reliable manner such that the convenience of a passive entry system is sufficiently utilized. In the case of the example described above, in particular, Steps S2–S6 indicate that when the detection output (such as the detection output A) corresponding to a specified detection area other than the smallest of the plurality of detection areas (such as the detection area A), the startup signal as a request signal is transmitted to start communications with the portable unit 10 and the door is automatically unlocked thereafter if the conditions therefor (such as the matching of the ID codes) are all satisfied. In other words, as soon as the user's hand is detected in the largest one of the plurality of detection areas, the portable unit is activated and communication therewith is started. Thus, time-consuming operations such as the communication with the portable unit 10 and the checking of the correctness of the ID code can be completed dependably and the door can be unlocked before the user's hand comes to contact the door handle. This means that the response characteristic is good according to this invention.

(3) Since a radar using electromagnetic waves is used, it is not necessary to set all of the components of the detector 30 (such as the sensor circuit 31) at a specified position (such as the position of the door handle) where the approaching object is intended to be detected. It is only the antennas 32 and 33 that are required to be located at or near the specified position. In the case of the example described above, since the detection is judged by the frequency and amplitude level of the reflected wave signal and the microcomputer is not used for the judgment, the structure of the sensor circuit 31 is particularly simplified and compact such that the detector 30 inclusive of its sensor circuit 31 can be installed inside the door handle relatively easily. Thus, the shape and the size of the door handle need not be modified and the freedom in its design is not significantly affected.

(4) As explained above, the microcomputer need not be used for the judgment. Explained more in detail, the judgment on the detection can be carried out reliably by a simple operation at the judging circuit parts 40 and 41 comprising bandpass filters. Thus, the power consumption is significantly less than by a prior art impulse radar which carries out operations by using a microcomputer for a complicated waveform analysis and judgment, and the detector can be mounted easily to a vehicle for the generation of a trigger for a passive entry system because there is no problem of using up the battery cells. In the case of the example described above, in particular, the transmission clock generator circuit 34 and the reception clock generator circuit 36 are formed as separate oscillator circuits and the step of dividing the standard wave into many parts for generating a beat wave is obviated. The power consumption is reduced also for this reason and the rate of power consumption by the detector 30 is particularly small.

(5) The detector 30 has a plurality of detection areas with different sizes (such as two detection areas A and B in the example shown above) and is structured such that an approaching object is detected from each of these detection areas and a plurality of detection outputs (such as the detection outputs A and B) are individually switched on. Moreover, if both detection outputs A and B are switched on approximately simultaneously, the detection result is corrected to be negative by a correction means (or by a function of the control circuit). Thus, erroneous detection due to a strong disturbance or the like can be reliably obviated.

(6) One of the conditions for automatically unlocking the door is that after the detection output (such as the detection output A) corresponding to a specified one of the plurality of detection areas (such as the detection area A) is switched on, the detection output (such as the detection output B) corresponding to another detection area (such as the detection area B) smaller than the aforementioned specified detection area is sequentially switched on (as shown by Steps S2 and S5 and described above). Thus, even if the specified detection area is made significantly large in order to improve the sensitivity, an abnormal detection output due to some person leaning on the door handle can be reliably distinguished and only the user's hand approaching to open the door can be made to cause the automatic unlocking of the door.

(7) The detector 30 has two detection areas A and B with different sizes and the larger detection area A with a good response characteristic is used as the trigger for the automatic unlocking operation on the door while the smaller detection area B with higher reliability is used as the trigger for the automatic locking operation. Thus, detection areas with optimal sizes may be set according to the conditions of the system.

(8) Since the detector 30 can function favorably as a trigger for the automatic unlocking operation, as explained above, there is no need to provide switches of the type which used to appear on prior art detectors. This also serves to improve the freedom in design, and since the user is no longer required to operate on such push buttons, the detector of this invention has higher operability.

(9) A plurality of detection areas are provided to the detector 30 of this invention by means of a plurality of wave detecting means (the wave detection circuit parts 38 and 39) having different sampling timings and a plurality of corresponding judging means (the judging circuit parts 40 and 41) and without the need to provide a plurality of elements such as antennas or oscillator circuits. Thus, the detector of this invention is simpler in structure and more compact and consumes less power than prior art detectors of the kind requiring a plurality of electromagnetic wave-type sensors and hence can enjoy the advantages described above (such as lower power consumption and freedom in design) even more.

Figure 4:
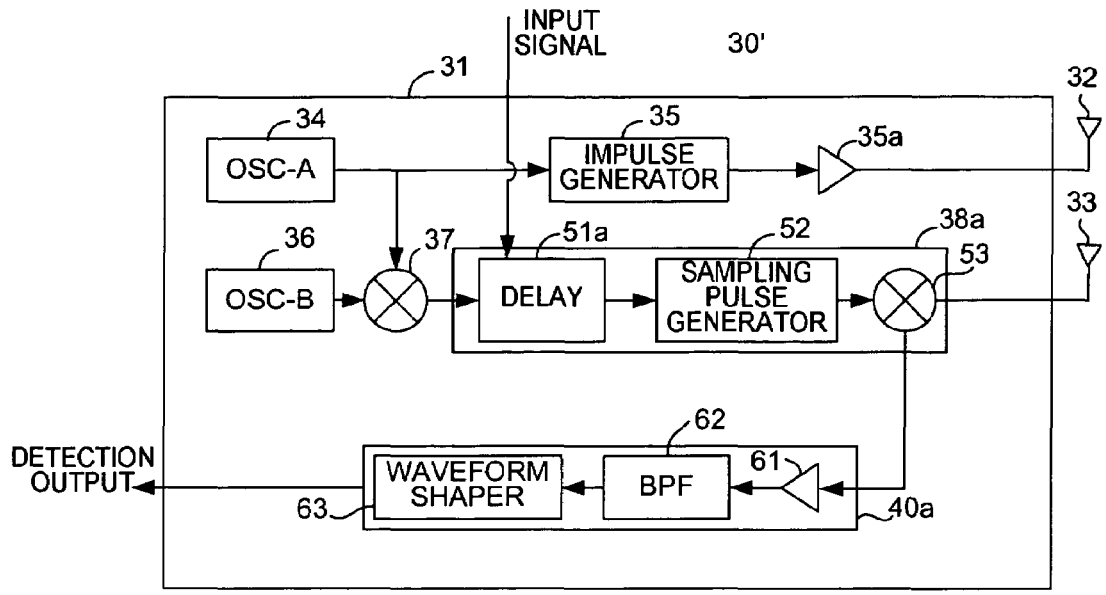
FIG. 4 is a block diagram of another detector embodying this invention.

FIG. 4 shows another detector 30' embodying this invention, which may be regarded as a variation of the detector 30 described above, having its wave detection and judging means formed as single circuits (that is, a single wave detection circuit part 38a and a single judging circuit part 40a corresponding thereto) and hence like components are indicated by the same numerals as in FIG. 1B and may not be described in a repetitious manner.

The wave detection circuit part 38a includes a delay circuit 5la, a sampling pulse generator circuit 52 and a sample-and-hold circuit 53. The delay circuit 51a is for setting the sampling timing specified by an input signal from the control circuit 21 (either the sampling timing A for providing the aforementioned detection area A or the sampling timing B for providing the detection area B) as the sampling timing corresponding to the timing for transmitting the aforementioned transmission wave.

If the user's hand to be detected enters the detection area A under the condition that the sampling timing A is established by means of the delay circuit 51a, the detection output from the judging circuit part 40a is switched on. If the user's hand further enters the detection area B under the condition that the sampling timing B is established by means of the delay circuit 51a, the detection output from the judging circuit part 40a is also switched on.

Next, the functions of the control circuit 21 and the operations of the system of this invention are explained. In basic terms, the sampling timing A is set while the door of the vehicle is in the locked condition (or while the door lock actuator 1 is activated) and if the detection output of the detector 30' is switched on under this condition, the aforementioned startup signal is outputted from the transmission circuit 22 and the transmission antenna 23 for a specified number of times and the reception circuit 24 is also activated to receive wave signals. If an answer signal is received from the portable unit 10 after the startup signals are transmitted, it is checked to determine whether or not the ID code contained in the answer signal corresponds to the ID code preliminarily registered in the memory. If the codes match, the door lock actuator 1 is controlled under the condition that the detection output with the sampling timing B is switched on such that the locked door of the vehicle is unlocked.

The sampling timing B is set if the door is in the unlocked condition, and if the detection output from the detector 30' is switched on under this condition, the startup signals are also transmitted. If the answer signal is received and the ID code is successfully checked, the door lock actuator 1 is controlled such that the unlocked door is locked.

Figure 5:
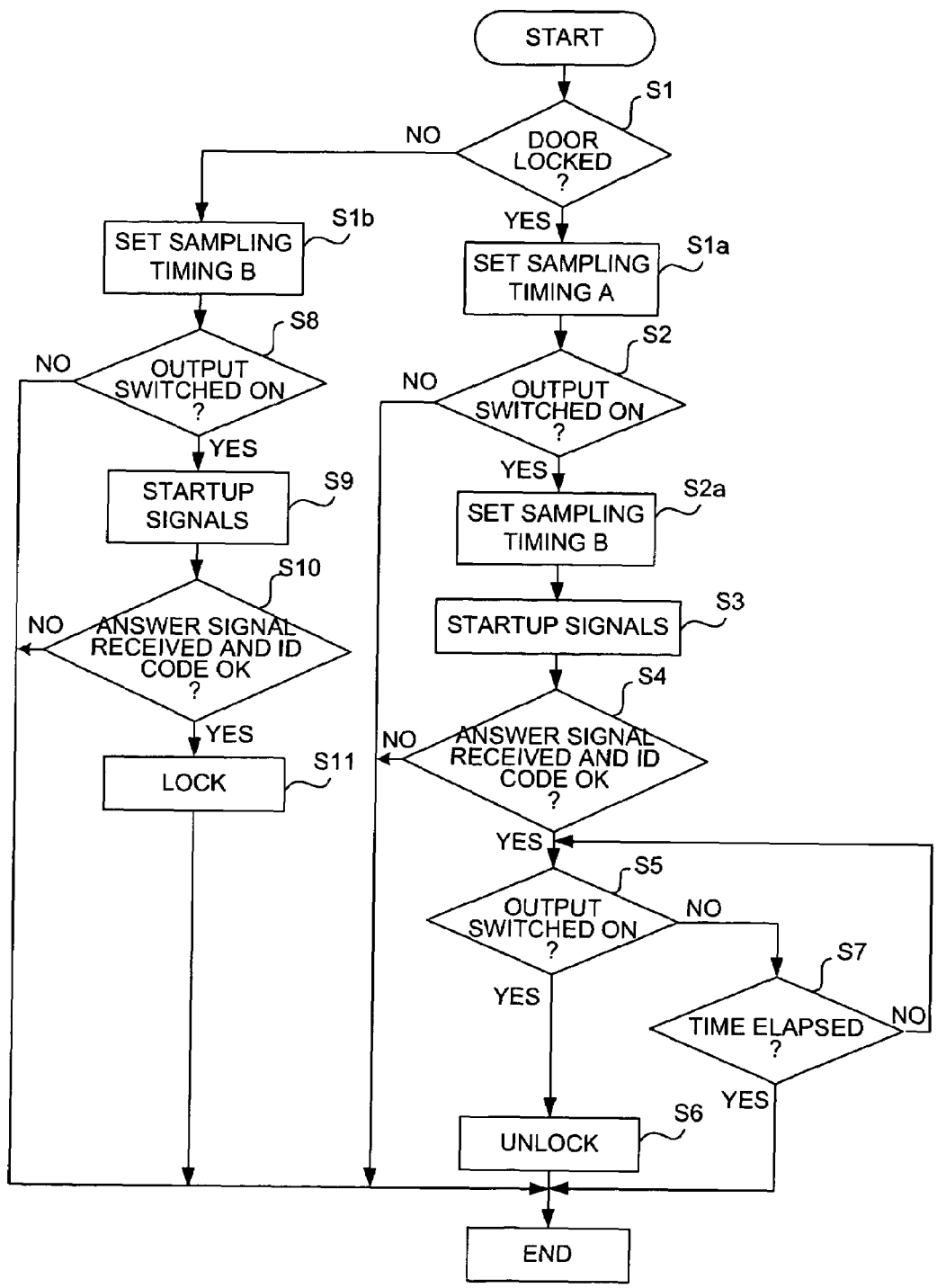
FIG. 5 is a flowchart of the control operations by the lock controller incorporating the detector according to the second embodiment of the invention.

FIG. 5 shows an example of flowchart for the control process explained above. The control circuit 21 may be adapted to repeat the operations of FIG. 5 in a periodic manner. Steps that are similar to those in FIG. 3 are again indicated by the same step numbers and may not be explained repetitiously.

If it is determined in Step S1 that the door is not in the locked condition (NO in Step S1), the process proceeds to Step 1B. If the door is locked (YES in Step S1) and the sampling timing A is not set yet, the input signal to the delay circuit 51a is changed to set the sampling timing A (Step S1a). It is determined thereafter whether or not the user's hand has been detected in the detection area, that is, whether or not the detection output of the detector 30' is switched on (Step S2). If the detection is not being made (NO in Step S2), the cycle of the processes is completed. If the detection is being made (YES in Step S2), the input signal to the delay circuit 51a is changed to set the sampling timing B (Step S2a).

Although not shown in FIG. 5, Step S2a may be followed by the step of examining the detection output as done in Step S2 and, if the detection output is switched on, further by the steps of terminating the cycle of the processes and concluding that the hand was detected in the detection area B too soon after its detection in the detection area A and that it must have been an error since the hand was detected practically simultaneously in two detection areas of different sizes. This serves to prevent the door from becoming unlocked inadvertently due, for example, to an external disturbance.

Thereafter, the startup signals are transmitted (Step S3) and if the answer signal is received and its ID code is correct (YES in Step S4) and if it is further determined that the user's hand was detected in the detection area B appropriately after it was detected in the detection area A (YES in Step S5), the door is unlocked (Step S6). If the hand is not detected (NO in Step S5), the process proceeds to Step 7 as explained above with reference to FIG. 3.

If it is determined in Step S1b that the sampling timing B is not set, the input signal to the delay circuit 51a is changed and the sampling timing B is set and it is then determined whether the user's hand has been detected in the detection area B (Step S8). If it has not been detected (NO in Step S8), the cycle of the processes is terminated. If it has been detected (YES in Step S8), the startup signals are outputted as done in Step S3 and if the answer signal has been received and its ID code is correct (YES in Step S10), the door lock actuator 1 is controlled and the door is locked (Step S11) as explained above with reference to FIG. 3).

The detector 30' according to the second embodiment of the invention enjoys all the advantages of the detector 30 according to the first embodiment described above. In addition, it is advantageous in that only a single circuit is required each for the wave detection circuit part and the judging circuit part and hence the detector can be made even simpler and more compact.

It now goes without saying that the invention is not limited by the examples described above. Many modifications and variations are possible within the scope of the invention. For example, the present invention is applicable not only to locks on a vehicle door but all kinds of controlled systems. The detector according to this invention may be used to detect the user's hand approaching the trunk handle. It may be used also on boats and small airplanes and also for the control of a building door. Although the examples given above were for cases of detecting the user's hand, the target object of detection need not be the hand of a person. If the characteristics of the bandpass filters are modified, the detector may be used for the detection of target objects of different kinds such as rain drops.

Figure 6A:
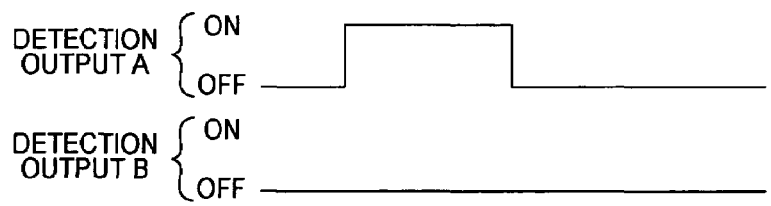
FIGS. 6A and 6B are drawings for explaining detection outputs according to other examples.
Figure 6B:
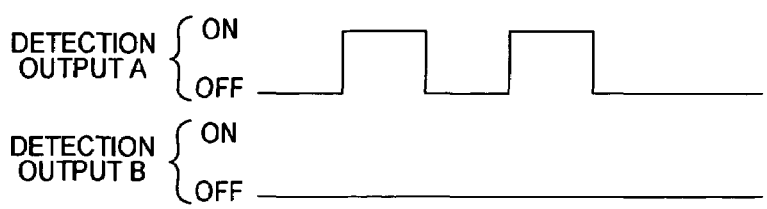

Although an example was shown above wherein a single detection output from the smaller detection area B (the detection output B being switched on once) was to serve as the trigger for the automatic locking of the door, this is not intended to limit the scope of the invention. FIG. 6A shows another example wherein the automatic locking operation is triggered if only the detection output A is switched on once. FIG. 6B shows still another example wherein the automatic locking operation is triggered if the detection output A alone is switched on twice within a specified length of time, say, as the user sticks out the hand into the detection area A, withdraws it therefrom and repeats the motion for the second time.

The detector and the antennas of the main device many be produced with a metallic or resin materials as separate components independent of the parts to which they are to be attached (such as inside or on the surface of a door handle or a door) by pressing in or by using screws. Instead, they may be integrally formed with a plastic door handle or molded into a door. Alternatively, antennas of a conductive resin material may be formed on a door handle or a door of a resin material by the so-called two-color molding process. Antennas may be formed by plating on a resin material.

The aforementioned request signal according to this invention may include not only a startup signal for starting up the portable unit in a SLEEP mode (the microcomputer being in the WAIT mode) but also a signal for asking the portable unit already started up (whether or not the microcomputer is still in the WAIT mode) to transmit a specified answer signal. Such a request signal is not required to be sent on the LF band but may be sent on other bands such as the UHF band, although the use of the LF band is advantageous because power transmission can be effected relatively efficiently.

The request signal may contain its own characterization code (preferably different from the aforementioned ID code for security reasons) because there may be many vehicles having entry systems of the same kinds parked in the neighborhood. In such a situation, the portable unit will be receiving request signals transmitted from all these vehicles and it is therefore necessary to arrange it such that the portable unit will not be required to transmit an answer signal each time such a request signal is received and will transmit the answer signal only after checking the characterization code of each received request signal.

The antennas on the main device and those on the detector may be integrated into one common antenna if there is no problem, say, with the different frequency bands to be used.

In summary, the electromagnetic wave radar technology is used according to this invention to provide a detector which is superior in reliability, response characteristics, operability by the user and suitability to a vehicle (say, in terms of size, design limitations and power consumption rate), as well as a lock controller (or a controller for a passive entry system) of a superior quality.

What is claimed is:

1. A detector for detecting a target object approaching inside detection areas, said detector comprising:
    a wave outputting device for outputting waves at a specified transmission timing;
    a transmission antenna for transmitting transmission waves outputted by said wave outputting device as electromagnetic waves into space;
    a reception antenna for receiving the electromagnetic waves transmitted from said transmission antenna and reflected from said target object;
    a plurality of wave detection circuit parts with delay circuits for setting different sampling timings with delays from said specified transmission timing according to distances between said detector and specified detection areas, mixing wave detection signals corresponding to said transmission waves with signals received by said reception antenna at said different sampling timings and outputting the mixed signals; and
    a plurality of judging circuit parts each corresponding to different one of said wave detection circuit parts and serving to switch on a detection output based on the outputted signals from said wave detection circuit parts to indicate that said target object is approaching;
    wherein said detection areas have different sizes for each of said judging circuit parts corresponding to said different sampling timings of said wave detection circuit parts.

2. The detector of claim 1 which is provided to a structure with a lockable part having a handle and being adapted to open and close, said target object being a hand of a user approaching said handle.

3. A detector using electromagnetic waves and having a plurality of detection areas with different sizes, said detector comprising:
    a sensor circuit for switching on a detection output by detecting in each of said detection areas presence of a target object; and
    a correcting device for concluding that said target object is absent if the detection outputs associated with said plurality of detection areas are switched on substantially simultaneously.

4. The detector of claim 3 which is provided to a structure with a lockable part having a handle and being adapted to open and close, said target object being a hand of a user approaching said handle.

5. A detector for detecting a target object approaching inside a detection area, said detector comprising:
    a wave outputting device for outputting waves at a specified transmission timing;
    a transmission antenna for transmitting transmission waves into air as electromagnetic waves by said wave outputting device;
    a reception antenna for receiving the electromagnetic waves transmitted from said transmission antenna and reflected from said target object;
    a wave detection circuit part with delay circuits for setting a plurality of sampling timings with delays from said specified transmission timing based on input signals, mixing wave detection signals corresponding to said transmission waves with signals received by said reception antenna at said sampling timings and outputting the mixed signals; and
    a judging circuit part serving to switch on a detection output based on the outputted signals from said wave detection circuit part to indicate that said target object is approaching;
    wherein the size of said detection area changes corresponding to said specified sampling timing.

6. The detector of claim 5 which is provided to a structure with a lockable part having a handle and being adapted to open and close, said target object being a hand of a user approaching said handle.

7. A lock controller comprising a detector according to claim 2 and a main apparatus which is provided to a structure with a lockable part having a handle and being adapted to open and close, wherein said main apparatus is adapted to send by wireless transmission a specified request signal to a portable device carried by said user if a detection output corresponding to a specified one of said detection areas of said detector is switched on while said structured is locked, said specified one being not the smallest of said detection areas, to receive an answer signal from said portable device in response to said request signal, and to cause said lockable part to be unlocked after ascertaining that specified conditions for unlocking are satisfied, said specified conditions including condition that said received answer signal be a correct signal.

8. The lock controller of claim 7 wherein said specified conditions also include another condition that the detection output corresponding to another detection area smaller than said one detection area be switched on after the detection output corresponding to said specified detection area is switched on.

9. The lock controller of claim 7 wherein said main apparatus is adapted to send by wireless transmission another specified request signal to said portable device carried by said user if a detection output corresponding to a detection area smaller than said one detection area of said detector is switched on while said structured is unlocked, to receive an answer signal from said portable device in response to said request signal, and to cause said structure to be locked after ascertaining that said received answer signal is a correct signal.

10. The lock controller of claim 8 wherein said main apparatus is adapted to send by wireless transmission another specified request signal to said portable device carried by said user if a detection output corresponding to a detection area smaller than said one detection area of said detector is switched on while said structured is unlocked, to receive an answer signal from said portable device in response to said request signal, and to cause said structure to be locked after ascertaining that said received answer signal is a correct signal.

11. A lock controller comprising a detector according to claim 4 and a main apparatus which is provided to a structure with a lockable part having a handle and being adapted to open and close, wherein said main apparatus is adapted to send by wireless transmission a specified request signal to a portable device carried by said user if a detection output corresponding to a specified one of said detection areas of said detector is switched on while said structured is locked, said specified one being not the smallest of said detection areas, to receive an answer signal from said portable device in response to said request signal, and to cause said lockable part to be unlocked after ascertaining that specified conditions for unlocking are satisfied, said specified conditions including condition that said received answer signal be a correct signal.

12. The lock controller of claim 11 wherein said specified conditions also include another condition that the detection output corresponding to another detection area smaller than said one detection area be switched on after the detection output corresponding to said specified detection area is switched on.

13. The lock controller of claim 11 wherein said main apparatus is adapted to send by wireless transmission another specified request signal to said portable device carried by said user if a detection output corresponding to a detection area smaller than said one detection area of said detector is switched on while said structured is unlocked, to receive an answer signal from said portable device in response to said request signal, and to cause said structure to be locked after ascertaining that said received answer signal is a correct signal.

14. The lock controller of claim 12 wherein said main apparatus is adapted to send by wireless transmission another specified request signal to said portable device carried by said user if a detection output corresponding to a detection area smaller than said one detection area of said detector is switched on while said structured is unlocked, to receive an answer signal from said portable device in response to said request signal, and to cause said structure to be locked after ascertaining that said received answer signal is a correct signal.

15. A lock controller comprising a detector according to claim 6 and a main apparatus which is provided to a structure with a lockable part having a handle and being adapted to open and close;

wherein said main apparatus, when said lockable part in locked, is adapted to set the specified sampling timing of said wave detection circuit part so as to make said detection area relatively large, to send by wireless transmission a specified request signal to a portable device carried by said user if a detection output of said detector is switched on with said detection area made relatively large, to receive an answer signal from said portable device in response to said request signal, and to cause said lockable part to be unlocked after ascertaining that specified conditions for unlocking are satisfied, said specified conditions including condition that said received answer signal be a correct signal; and wherein said main apparatus, when said lockable part is unlocked, is adapted to set the specified sampling timing of said wave detection circuit part so as to make said detection area relatively small, to send by wireless transmission a specified request signal to said portable device carried by said user if a detection output of said detector is switched on with said detection area made relatively small, to receive an answer signal from said portable device in response to said request signal, and to cause said lockable structure to be locked after ascertaining that said received answer signal is a correct signal.

16. The lock controller of claim 15 wherein said specified conditions further include condition that said detection output be switched on with said detection area made relatively small by setting said specified sampling timing of said wave detection circuit part accordingly after said detection output becomes switched on with said sampling timing of said wave detection circuit part set so as to make said detection area relatively large.

17. The detector of claim 2 wherein said judging parts includes bandpass filters and said detection output is switched on only if said target object is judged to be approaching at a speed within a specified range.

18. The detector of claim 4 wherein said judging parts includes bandpass filters and said detection output is switched on only if said target object is judged to be approaching at a speed within a specified range.

19. The detector of claim 6 wherein said judging parts includes bandpass filters and said detection output is switched on only if said target object is judged to be approaching at a speed within a specified range.

* * * * *